United States Patent
Lee

(10) Patent No.: US 11,520,008 B2
(45) Date of Patent: Dec. 6, 2022

(54) RADAR TARGET EMULATION AND MULTI-DISTANCE EMULATION USING PMCW RADAR

(71) Applicant: Keysight Technologies, Inc., Santa Rosa, CA (US)

(72) Inventor: Gregory S. Lee, Mountain View, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 89 days.

(21) Appl. No.: 16/995,913

(22) Filed: Aug. 18, 2020

(65) Prior Publication Data
US 2021/0055383 A1 Feb. 25, 2021

Related U.S. Application Data

(60) Provisional application No. 62/912,442, filed on Oct. 8, 2019, provisional application No. 62/889,267, filed on Aug. 20, 2019.

(51) Int. Cl.
*G01S 7/40* (2006.01)
*G01S 13/40* (2006.01)

(52) U.S. Cl.
CPC ............ *G01S 7/4052* (2013.01); *G01S 13/40* (2013.01); *G01S 7/4065* (2021.05); *G01S 7/4078* (2021.05)

(58) Field of Classification Search
CPC .......... G01S 7/40; G01S 7/4052; G01S 7/406; G01S 7/4065
See application file for complete search history.

(56) References Cited

U.S. PATENT DOCUMENTS 4,613,863 A * 9/1986 Mitchell ................... G01S 7/38
342/14
4,660,041 A * 4/1987 Maples ..................... G01S 7/40
342/170
(Continued)

FOREIGN PATENT DOCUMENTS

CN 102928824 B 2/2013
CN 109459733 A 3/2019
(Continued)

OTHER PUBLICATIONS

International Search Report and Written Opinion for PCT Application No. PCT/US2020/031588 dated Aug. 21, 2020, 9 pgs.
(Continued)

*Primary Examiner* — Peter M Bythrow

(57) ABSTRACT

A method of testing vehicular radar includes acquiring binary phase codes of transmitters in a radar DUT; acquiring desired FOVs and desired angular resolutions of the transmitters to determine target angles of emulated targets; calculating far field phases of a PMCW signal for binary phase states of the transmit array at each of the target angles to determine resultant phase symbol streams; calculating excess roundtrip time delay for each emulation delay, between the DUT and the emulated targets, and each setup delay between the DUT and each emulator receiver; timeshifting the resultant phase symbol streams by the excess roundtrip time delays; subtracting the time-shifted resultant phase symbol streams from the resultant phase symbol streams to obtain difference phase symbol streams; modulating a PMCW signal transmitted by the DUT by the difference phase symbol streams; and emulating the echo signals at the target angles in response to the modulated PMCW signal.

20 Claims, 8 Drawing Sheets

(56) References Cited

U.S. PATENT DOCUMENTS

| | | | | |
|---|---|---|---|---|
| 4,686,534 | A * | 8/1987 | Eddy | G01S 7/4052 342/6 |
| 4,737,792 | A * | 4/1988 | Grone | G01S 7/4052 342/169 |
| 5,117,230 | A * | 5/1992 | Wedel, Jr. | G01S 7/4056 342/194 |
| 5,177,488 | A * | 1/1993 | Wang | G01S 7/4052 250/227.12 |
| 5,247,843 | A | 9/1993 | Bryan | |
| 5,431,568 | A * | 7/1995 | Fey | G09B 9/54 342/174 |
| 5,457,463 | A * | 10/1995 | Vencel | G09B 9/54 342/170 |
| 5,528,522 | A * | 6/1996 | Delguercio | G01S 7/4052 703/13 |
| 5,892,479 | A * | 4/1999 | Mills | G01S 7/4052 342/170 |
| 6,067,041 | A * | 5/2000 | Kaiser | G01S 7/4052 342/171 |
| 6,075,480 | A * | 6/2000 | Deliberis, Jr. | G01S 7/4052 342/194 |
| 6,114,985 | A | 9/2000 | Russell et al. | |
| 6,384,771 | B1 * | 5/2002 | Montague | G01S 7/4052 342/170 |
| 6,496,139 | B1 * | 12/2002 | Flacke | G01S 7/4052 342/171 |
| 6,803,877 | B2 * | 10/2004 | Ludewig | G01S 7/4052 342/170 |
| 7,145,504 | B1 * | 12/2006 | Newberg | G01S 7/4052 342/195 |
| 8,334,803 | B1 * | 12/2012 | Urkowitz | G01S 7/4052 342/168 |
| 9,151,828 | B2 * | 10/2015 | Shipley | H01Q 21/225 |
| 9,581,683 | B2 * | 2/2017 | Choi | G01S 7/4056 |
| 10,509,107 | B2 * | 12/2019 | Heuel | G01S 7/4052 |
| 10,527,715 | B2 * | 1/2020 | Ahmed | G01S 7/4052 |
| 2006/0267832 | A1 * | 11/2006 | Newberg | G01S 7/4052 342/195 |
| 2008/0018525 | A1 * | 1/2008 | Svy | G01S 7/4052 342/172 |
| 2015/0219752 | A1 * | 8/2015 | Lewis | G01S 7/4052 342/104 |
| 2015/0369905 | A1 | 12/2015 | Shipley | |
| 2017/0010347 | A1 | 1/2017 | Schutte et al. | |
| 2017/0115378 | A1 * | 4/2017 | Haghighi | G01S 7/4052 |
| 2017/0270376 | A1 | 9/2017 | Aina | |
| 2019/0041496 | A1 * | 2/2019 | Salvesen | G01S 7/285 |
| 2019/0391234 | A1 * | 12/2019 | Gruber | G01S 7/4052 |
| 2020/0019160 | A1 * | 1/2020 | McArthur | G01S 17/87 |
| 2021/0055384 | A1 | 2/2021 | Lee | |

FOREIGN PATENT DOCUMENTS

| | | |
|---|---|---|
| CN | 112630733 A | 4/2021 |
| CN | 114258498 A | 3/2022 |
| DE | 102020212593 A1 | 4/2021 |
| JP | H07174840 A | 7/1995 |
| JP | 2022018108 A | 1/2022 |
| KR | 10-2017-0069246 A | 6/2017 |
| KR | 10-2017-0103263 A | 9/2017 |
| WO | 2019/068126 A1 | 4/2019 |
| WO | 2021034357 A1 | 2/2021 |

OTHER PUBLICATIONS

Fraunhofer-Gesellschaht. Virtual tests for autonomous driving systems. Phys.org [online], Apr. 1, 2019, https://phys.org/news/2019-04-virtual-autonomous.html, pp. 1-3.

D Meena et al., "Design of Multilevel Radar Target Simulator," 2007 IEEE Radar Conference, pp. 203-208.

Werner Scheiblhofer et al., "Low-cost Target Simulator for End-of-Line Tests of 24-GHz Radar Sensors", Warsaw Univ. of Technology, 2018, pp. 531-534.

Werner Scheiblhofer et al., "A Low-Cost Multi-Target Simulator for FMCW Radar System Calibration and Testing", Proceedings of the 14th European Radar Conference, 2017, pp. 343-346.

Michael Ernst Gadringer et al., "Radar target stimulation for automotive applications", IET Radar, Sonar, and Navigation, vol. 12, issue 10, 2018, pp. 1-8.

David B. Rutledge et al., "Performance of a 100-element HBT grid amplifier", IEEE Transactions on Microwave Theory and Techniques, vol. 41, No. 10, Oct. 1993, pp. 1762-1771.

Non-Final Office Action dated Jun. 28, 2022, for U.S. Appl. No. 16/867,804, 31 pgs.

* cited by examiner

RADAR TARGET EMULATION AND MULTI-DISTANCE EMULATION USING PMCW RADAR

CROSS-REFERENCE TO RELATED APPLICATIONS

This application claims priority under 35 U.S.C. § 119(e) from commonly owned U.S. Provisional Application No. 62/889,267 to Gregory S. Lee, et al. entitled "Multi-Target Radar Emulator System" filed on Aug. 20, 2019. This application also claims priority under 35 U.S.C. § 119(e) from U.S. Provisional Application 62/912,442 entitled "Radar Target Emulation and Multi-Distance Emulation using PMCW Radar" filed on Oct. 8, 2019, which names Gregory S. Lee. The entire disclosures of U.S. Provisional Applications Nos. 62/889,267 and 62/912,442 are incorporated by reference in its entirety.

BACKGROUND

Millimeter wave (mmWave) automotive radar is a key technology for advanced driver-assistance systems (ADAS) and for planned autonomous driving systems. Millimeter waves result from oscillations at frequencies in the frequency spectrum between 30 gigahertz (GHz) and 300 GHz. For example, millimeter wave automotive radar is used in ADAS to warn of forward collisions and backward collisions, to implement adaptive cruise control and autonomous parking, and ultimately to perform autonomous driving on streets and highways. Millimeter wave automotive radar has advantages over other sensor systems in that millimeter wave automotive radar can work under most types of weather and in light and darkness. Adaptation of millimeter wave automotive radar has lowered costs to the point that mmWave automotive radar can now be deployed in large volumes. Thus, mmWave automotive radar is now widely used for long range, middle range and short range environment sensing in ADAS. Additionally, millimeter wave automotive radar systems are likely to be widely used in autonomous driving systems currently being developed.

Conventional automotive mmWave radar systems typically have multiple radio frequency (RF) transmitters and multiple RF receivers, where the RF transmitters may be used either to improve spatial resolution of the radar or to achieve transmitter beam sweeping. Actual driving environments in which automotive radars may be deployed can vary greatly and many such driving environments may be complex. For example, actual driving environments may contain numerous objects, and some objects encountered in actual driving environments have complicated reflection, diffraction and multi-time reflection characteristics that affect echo signals. The immediate consequences of incorrectly sensing and/or interpreting echo signals may be that false warnings or improper reactions are triggered or warnings or reactions that should be triggered are not, which in turn can lead to collisions.

In recent years, developers testing autonomous vehicles in actual driving environments have reported a series of accidents, showing the importance of thorough testing for automotive radar and on-vehicle driving controllers. Road testing can be problematic and is also very expensive. Only a few places worldwide have allowed so-called driverless road testing, although it is controversial where it has been permitted. Nearly all such locales require a person in the driver seat in case the artificial intelligence (AI) system of the autonomous vehicles were to make a critical error. Further, much of the early data are questionable because too often the (safety) driver, out of either instinct or boredom, would actively manipulate the steering wheel, sometime during crucial periods of performance. Now, a passenger is often in the automobile along with the driver to help monitor the driver's action, as well as to log other observations.

To avoid such accidents, automotive radars may be tested in various driving scenarios. A testing environment for automotive radars may include a scenario emulator which emulates echo signals from multiple objects or targets (multi-target echo signals) to the different radar sensors or radar device under test (DUT) on a vehicle under the driving scenarios. This enables simulation of a wide variety of driving scenarios without the need for safety drivers or permission from local governments. Whereas single-target emulation is well established, multi-target emulation is in its infancy. Most demonstrators today show up to three corner cube antennas sliding back and forth, each antenna connected to a costly arbitrary waveform generator (AWG). This is unscalable to more targets due to equipment cost and the fact that dynamically varying angles of arrival (AoAs) representative of driving scenarios quickly lead to problems manipulating the corner cubes without mutual blockage or even antenna-antenna collision.

Currently, frequency-modulated continuous-wave (FMCW) radars constitute nearly 100 percent of the automotive radar market. However, it is anticipated that phase-modulated continuous-wave (PMCW) will be the next (3rd) generation automotive radar technology with perceived advantages in interference immunity and finer range resolution. The interference immunity, in particular, arises from code orthogonality, similar to what occurs in phase-modulated code division multiple access (CDMA) technology.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
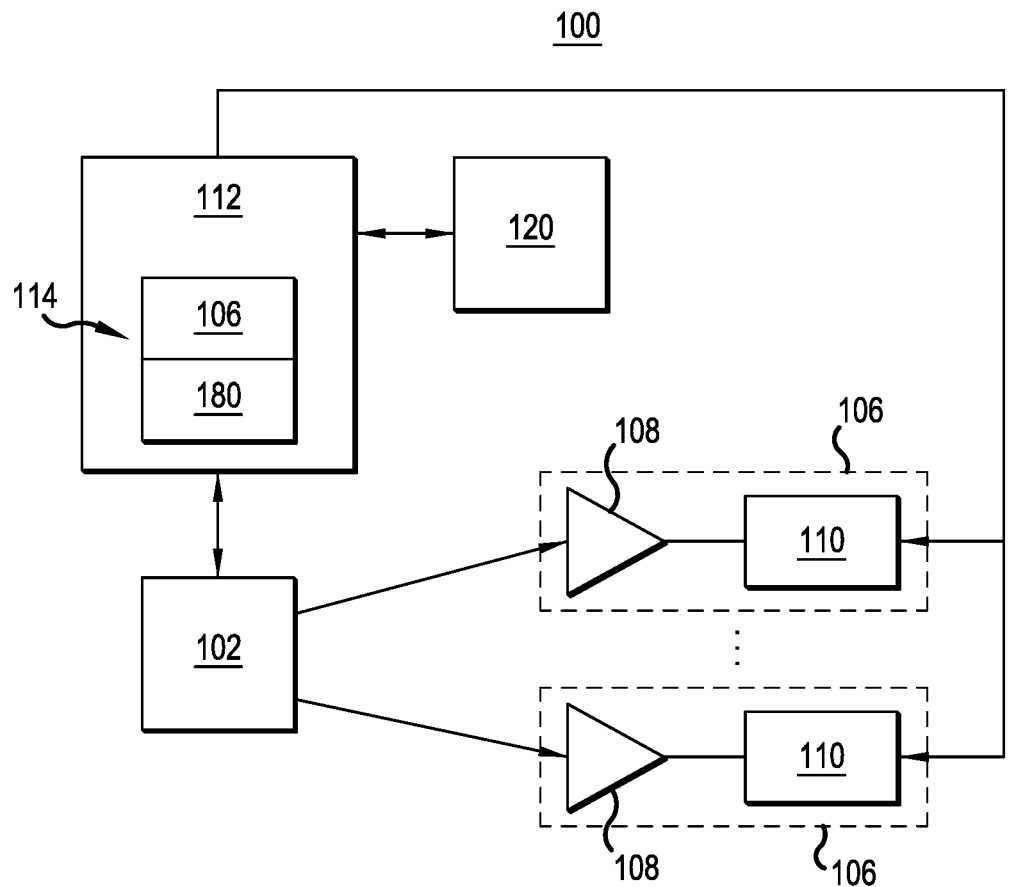
FIG. 1A is a simplified block diagram showing system for testing vehicular radar in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a target emulation system is able to emulate target echo signals responsive to simultaneous PMCW radar signal transmissions on multiple transmitters of the radar DUT. PMCW radars use CDMA techniques to mitigate interference from other vehicles also deploying radar. Therefore, different phase codes of the PMCW radar signals are orthogonal to each other, so that more intensive signal processing will suppress interferers. The phase code may completely supplant FM chirp used in FMCW radars, in which case the CDMA itself achieves ranging functions, and thus the IQ modulator of an FMCW radar system may be replaced with a binary phase modulator using a unique phase code, e.g., which may be obtained from the radar DUT vendor. Generally, emulated delay corresponding to an emulated radar target is determined by modulating a carrier signal by the difference between a setup-delayed code waveform and an emulated delay code waveform. In this way, the DUT receivers receive a code stream corresponding to the desired emulated delay. Also, in embodiments for either FMCW radar signals or PMCW radar signals disclosed herein, more than one target per illuminator may be emulated, provided that these targets share the same angle of arrival (AoA) with respect to the radar DUT.

FIG. 1A is a simplified block diagram showing system 100 for testing vehicular radar in accordance with a representative embodiment. As will be appreciated by one of ordinary skill in the art having the benefit of the present disclosure, one likely vehicular radar is an automobile radar that is used in various capacities in current and emerging automobile applications. However, it is emphasized that the presently described system 100 for testing vehicular radar is not limited to automobile radar systems, and can be applied to other types of vehicles including busses, motorcycles, motorized bicycles (e.g., scooters), and other vehicles that could employ a vehicular radar system.

Referring to FIG. 1A, the system 100 is arranged to test a radar device under test (DUT) 102, and comprises multiple re-illuminators 106. Each of the re-illuminators 106 comprises at least one re-illumination antenna 108 and at least one modulated reflection device (MRD) 110. As described more fully herein, there is one re-illuminator for each emulated target. In an embodiment, the system 100 may further comprise a diffractive optical element (DOE), in addition to the re-illuminators 106, as described in U.S. Provisional Patent Application No. 62/889,267 to Gregory S. Lee, filed Aug. 20, 2019, which is incorporated herein by reference in its entirety. The system 100 is configured to receive PMCW radar signals (or FMCW radar signals) from the radar DUT 102, which has multiple radar transmitters and corresponding transmit antennae.

The system 100 also comprises a computer 112, which includes a controller 114. The controller 114 described herein may include a combination of a memory 116 that stores instructions and an illustrative processor 118 that executes the instructions in order to implement processes described herein. A database 120 may store information to be used for target emulation, including various predetermined scenarios, as well as parameters of a particular DUT 102, such as codes, and fields of view (FOVs). The controller 114 may be housed within or linked to a workstation such as the computer 112 or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller(s), slot(s) and port(s).

Additionally, although the computer 112 and/or the controller 114 shows components networked together, two such components may be integrated into a single system. For example, the computer 112 and/or the controller 114 may be integrated with a display (not shown) and/or with the system 100. On the other hand, the networked components of the computer 112 and/or the controller 114 may also be spatially distributed such as by being distributed in different rooms or different buildings, in which case the networked components may be connected via data connections. In still another embodiment, one or more of the components of the computer 112 and/or the controller 114 is not connected to the other components via a data connection, and instead is provided with input or output manually such as by a memory stick or other form of memory. In yet another embodiment, functionality described herein may be performed based on functionality of the elements of the computer 112 and/or the controller 114 but outside the system 100.

The computer 112 and/or the controller 114 may be implemented as a processing unit. In various embodiments, the processing unit may include one or more computer processors (e.g., processor 118), digital signal processors (DSP), field-programmable gate arrays (FPGAs), application specific integrated circuits (ASICs), or combinations thereof, using any combination of hardware, software, firmware, hard-wired logic circuits, or combinations thereof. The computer 112 and/or the controller 114 may include its own processing memory (e.g., memory 116) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 2A. That is, execution of the instructions/computer readable code generally causes the processing unit of the computer 112 and/or the controller 114 to emulate echo signals reflected from emulated radar targets in response to the PMCW signals transmitted by the radar DUT 102. Memories (and databases) as described herein may be RAM, ROM, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

While the various components of the system 100 are described in greater detail in connection with representative embodiments below, a brief description of the function of the system 100 is presented currently.

In operation, the radar DUT 102 emits radar signals (illustratively mm wave signals) that are focused at a respective one of the antennae 108 of the MRDs 110, which as described more fully below, are beneficially comparatively high-gain antennae. For example, the system 100 may include a diffractive optical element (DOE), as described in U.S. Provisional Patent Application No. 62/889,267, mentioned above. The emitted radar signals are incident on a first side of the DOE, which diffracts the signals from the radar DUT 102 to be focused at a respective one of the antennae 108. As such, the DOE diffracts the incident wave at a particular angle relative to a second side of the DOE, and each diffracted waved is focused on a respective one of the antennae 108. Of course, the system 100 may include other means of focusing the radar signals at respective ones of the antennae 108 of the MRDs 110, without departing from the scope of the present teachings. Notably, the respective focal points (alternatively foci) at each one of the antennae 108 represents a target that is emulated by the system 100.

Again, each of the radar signals is incident on a respective one of the antenna 108 of the re-illuminators 106. The radar signals incident on the antennae 108 are provided to a respective one of the MRDs 110. As described more fully herein, based on input from the controller 114, pulse code modulation of the incident signals is effected in each of the MRDs 110 and beneficially emulates a distance of a target from the radar DUT 102, or a velocity of a target relative to the radar DUT 102, or both. Moreover, and again as described more fully herein, the azimuth and the elevation are emulated by the antennae 108, which may be illustratively mechanically gimballed, or a combination of mechanical gimballing and electronic emulation. The re-illuminated signals provided by the MRDs 110 are incident on the radar DUT 102. The computer 112 receives the signals from the radar DUT 102 for further analysis of the accuracy of the radar DUT 102.

Figure 1B:
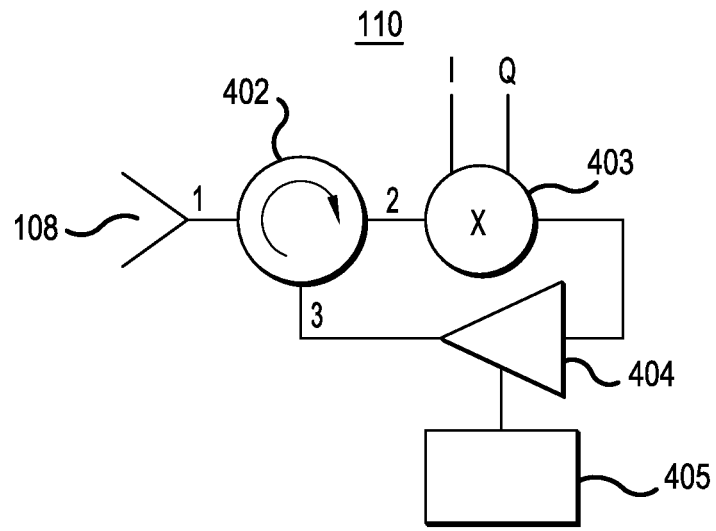
FIG. 1B is a simplified block diagram showing a modulated reflection device (MRD) in the system for testing vehicular radar in FIG. 1A, in accordance with a representative embodiment.

FIG. 1B is a simplified circuit diagram of the MRD 110 of FIG. 1A, in accordance with a representative embodiment. Aspects of the MRD 110 described in connection with the representative embodiments may be common to the MRDs and delay electronics described above, although they may not be repeated.

The MRD 110 is connected to a re-illumination antenna 108, and thus may be one of the re-illumination antennae described above. Of course, in practice, there is more than one MRD 110 in a system, and thus more than one re-illumination antenna 108 (e.g., as depicted in the representative embodiment of FIG. 1A). In certain representative embodiments, the re-illumination antenna 108 is a horn selected for the wavelength of signals received from the radar DUT 102. The re-illumination antenna 108 may have a variable gain, and may be coupled to a beamshaping element, such as a lens to tailor a degree of freedom of an AoA, as noted above. The horn or similar antenna for re-illumination antenna 108 is not essential, and other types of antennae, such as patch antennae or patch antennae arrays (described below), may be incorporated without departing from the scope of the present teachings.

The MRD 110 comprises a circulator 402 connected to a mixer 403. The mixer 403 is an in-phase (I)-quadrature (Q) mixer (IQ mixer), or I-Q modulator, which for reasons described below, is beneficially a single-sideband IQ mixer, with standard 90° phasing of the RF signal, resulting in an output of either the upper sideband (USB) or the lower sideband (LSB), rejecting the LSB or USB, respectively. Alternatively, the I-Q mixer 403 may be adapted for binary phase modulation (BPM), quaternary phase modulation (QPM), 8-phase modulation, 16-QAM, and the like. As discussed below, the modulation is selected to provide the desired degree of approximation of the difference phase symbols. Notably, approximation of the amplitude can be carried out by the I-Q mixer 403 using techniques within the purview of the ordinarily skilled artisan.

The output of the I-Q mixer 403 is provided to a variable gain amplifier (VGA) 404, which comprises a gain control input 405. As alluded to above, the gain control input 405 of the VGA 404 is connected to the computer 112. Notably, the VGA 404 enables proper emulation of the re-illuminated signal received from the DUT 102 at the re-illumination antenna 108. For example, when a DOE is involved, as noted above, the incident signal from the radar DUT 102 on the DOE is split among the number of foci at the re-illumination antennae 108. As such, upon diffraction by the DOE, the power of the signal is split, and therefore the power of each radar signal diffracted to the multiple foci at the re-illumination antennae 108 is reduced compared to the output power of the radar signal from the radar DUT 102. Moreover, as noted above, the portion (and thus the power) of the signal diffracted from foci on the side of the DOE facing the re-illumination antennae 108 depends on the orientation of the re-illumination antennae 108 relative to one or more foci at the re-illumination antennae 108. As such, the power of the signal incident on the re-illumination antenna 108 may be insufficient for re-transmission back to the radar DUT 102, and thus for accurate testing. Moreover, the power of the re-illuminated signal from the re-illumination antennae 108 is an indication of the emulated distance between an emulated target and the radar DUT 102. As such, the gain provided by the VGA 404 is selected at the gain control input 405 based on the power of the radar signal incident on the re-illumination antennae 108, and the desired emulation distance of the target being emulated.

Notably, power is used to emulate consistent radar cross-section (RCS). The RCS can be stored in look-up in tables in database 120, for example. To this end, for a given range r, it is known that the return signal is proportional to RCS and falls as $1/r^4$. A vehicle is typically quoted as being 10 dBsm, which is radar speak for measuring area, meaning 10 dB relative to a square meter (s.m.), or in plain English, 10 square meters. Many objects have been tabulated (people, bicyclists, buildings, etc.), and those that have not can be calculated these days by ray tracing techniques. By the present teachings, emphasis is placed on providing a return signal strength to the radar DUT 102 that is commensurate with the distance r (obeying the well-known $1/r^4$ radar decay law) and the accepted value of RCS for the particular object. In accordance with a representative embodiment, the signal strength (and thus power) is adjusted by adjusting the strength of the I/Q drive signals from the computer 112 to the MRDs of the various embodiments, with a weaker I/Q drive signal providing a comparatively weaker emulation signal. Notably, in certain representative embodiments, the computer 112 precomputes the consistent return signal provided to the single point of focus at the radar DUT 102, and the controller 114 then adjusts the strength of the I and Q drives to achieve this SSB strength. Alternatively, and beneficially, the gain of VGA 404 can be adjusted to control return SSB strength.

When the vehicular radar is an FMCW device, the distance/velocity is emulated electronically using the MRD 110. To this end, FMCW radar systems use chirped waveforms, whereby the correlation of the original transmit (Tx) waveform from the radar DUT 102 with the received (Rx) echo waveform reveals the target distance. For example, in upchirp/downchirp systems with chirp rates of $\pm k_{sw}$ (measured in Hz/sec), a target at a distance d and zero relative velocity to the ego vehicle will result in a frequency shift ($\delta f$) given by Equation (1), where c is the speed of light and the factor of 2 is due to the roundtrip propagation of the signal from the radar DUT 102:

$$\delta f = -(\pm 2k_{sw}d/c) \qquad \text{Equation (1)}$$

The sign of the shift depends on which part of the waveform, upchirp vs. downchirp, is being processed. In contrast, Doppler shifts due to relative velocity manifest as "common mode" frequency shifts; e.g., a net upshift over both halves of the waveform indicates the radar DUT is approaching closer to the target. Correlation is performed in the DUT's IF/baseband processor; bandwidths of a few MHz are typical.

The most commonly deployed variation of FMCW uses repetitive upchirps, or repetitive downchirps, but not both (with intervening dead times). As such, the distance to a target is determined as in the previous paragraph, now without the sign issue. Relative velocity is determined by measuring the phase shift between successive frame IF correlation signals, where frame is a term of art for one period of the waveform. In many FMCW radar applications, the frame repetition rate is typically a few kHz.

One known approach introduced the concept of receiving a transmit signal from a radar DUT at one or more probe points, then applying balanced phase modulation to the received signal, before returning the signal back to the radar DUT. Because phase modulation is another form of frequency modulation, balanced phase modulation of such a known system results in a double sideband (DSB) modulation of the original signal, suppressing the original swept carrier. Balanced phase modulation is rather easy to implement because one can simply switch between an open and a short load. If the modulation frequency is $\delta f^*$, and the original signal's time-dependent frequency is f(t), then due to comparatively slow chirp rates, the time-dependent frequency of the return signal is $f(t) \pm \delta f^*$. Equation (2) is derived from Equation (1) replacing d with a difference between a target distance of $d_{em}$ and a setup distance of $d_{su}$, which is the physical distance between the radar DUT 102 and the antenna 108 of one of the re-illuminators 106:

$$\delta f^* = 2k_{sw}(d_{em} - d_{su})/c \qquad \text{Equation (2)}$$

Due to DSB modulation, for every intentionally created target j at distance $d_{em,j}$, a twin ghost target may also be created at distance $d_{em,j} \pm 2d_{su,j}$, where $d_{su,j}$ is the setup distance to probe j, where the sign in the "ghosting equation" depends on the sign of the chirp slope. The method herein also suppresses such a ghost target.

Upon amplification/attenuation at the circulator 402, the MRD 110 provides an amplified/attenuated SSB signal that is returned to the circulator 402 and retransmitted out the re-illumination antenna 108. Notably, in the SSB MRD 110 of the representative embodiment, decreasing the strength of the modulation I and Q drive signals will decrease the output tone strength and thus decrease the RCS. In practice, this method likely will not achieve more than 15-20 dB of dynamic range by modulation drive alone. However, the VGA 404 makes up the deficit to achieve the desired RCS dynamic range, and 10-50 dB of variable gain can be readily achieved by a combination of variable attenuators and amplifier bias adjustment.

Figure 1C:
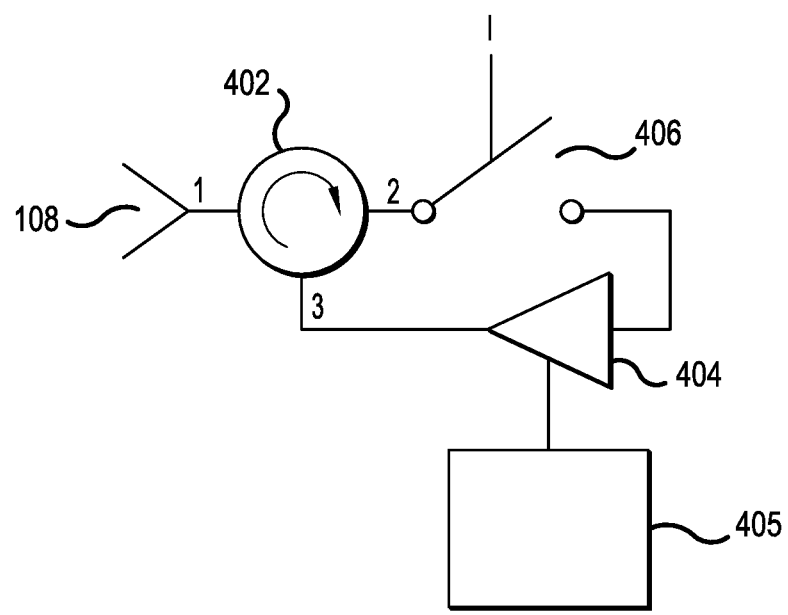
FIG. 1C is a simplified block diagram showing a modulated reflection device (MRD) in the system for testing vehicular radar in FIG. 1A, in accordance with a representative embodiment.

FIG. 1C is a simplified circuit diagram of the MRD 110 of FIG. 1A, in accordance with a representative embodiment. Aspects of the MRD 110 described in connection with the representative embodiments may be common to the MRDs and delay electronics described above, although they may not be repeated.

The MRD 110 is connected to a re-illumination antenna 108. Of course, in practice, there is more than one MRD 110 in a system, and thus more than one re-illumination antenna 108 (e.g., as depicted in the representative embodiment of FIG. 1A). In certain representative embodiments, the re-illumination antenna 108 is a horn selected for the wavelength of signals received from the radar DUT 102. The re-illumination antenna 108 may have a variable gain, and may be coupled to a beamshaping element, such as a lens to tailor a degree of freedom of an AoA, as noted above. The horn or similar antenna for re-illumination antenna 108 is not essential, and other types of antennae, such as patch antennae or patch antennae arrays (described below), may be incorporated without departing from the scope of the present teachings.

The MRD 110 comprises a circulator 402 connected to a binary switch 406, and thus provides only an in-phase (I) output, which for reasons described above, is beneficially a single-sideband. Because the IQ mixer 403 is replaced with the binary switch, modulation of the amplitude is carried out. To this end, the binary switch provides an output that is either a "1" or a "0." This results in a dithering of ½ above and ½ below the DC average. As will be appreciated, this has 6 dB worse sideband conversion efficiency compared to true binary phase modulation (using the I-Q mixer 403 of FIG. 1B), and also does not fully suppress the carrier. However, the MRD 110 of FIG. 1C is simple (and therefore less expensive) compared to the MRD 110 of FIG. 1B. The conversion efficiency deficit can easily be compensated by more gain from amplifier 404.

The output of the binary switch 406 is provided to VGA 404, which comprises gain control input 405. As alluded to above, the gain control input 405 of the VGA 404 is connected to the computer 112. Notably, the VGA 404 enables proper emulation of the re-illuminated signal received from the DUT 102 at the re-illumination antenna 108. For example, when a DOE is involved, as noted above, the incident signal from the radar DUT 102 on the DOE is split among the number of foci at the re-illumination antennae 108. As such, upon diffraction by the DOE, the power of the signal is split, and therefore the power of each radar signal diffracted to the multiple foci at the re-illumination antennae 108 is reduced compared to the output power of the radar signal from the radar DUT 102. Moreover, as noted above, the portion (and thus the power) of the signal diffracted from foci on the side of the DOE facing the re-illumination antennae 108 depends on the orientation of the re-illumination antennae 108 relative to one or more foci at the re-illumination antennae 108. As such, the power of the signal incident on the re-illumination antennae 108 may be insufficient for re-transmission back to the radar DUT 102, and thus for accurate testing. Moreover, the power of the re-illuminated signal from the re-illumination antennae 108 is an indication of the emulated distance between an emulated target and the radar DUT 102. As such, the gain provided by the VGA 404 is selected at the gain control input 405 based on the power of the radar signal incident on the re-illumination antennae 108, and the desired emulation distance of the target being emulated.

Figure 2A:
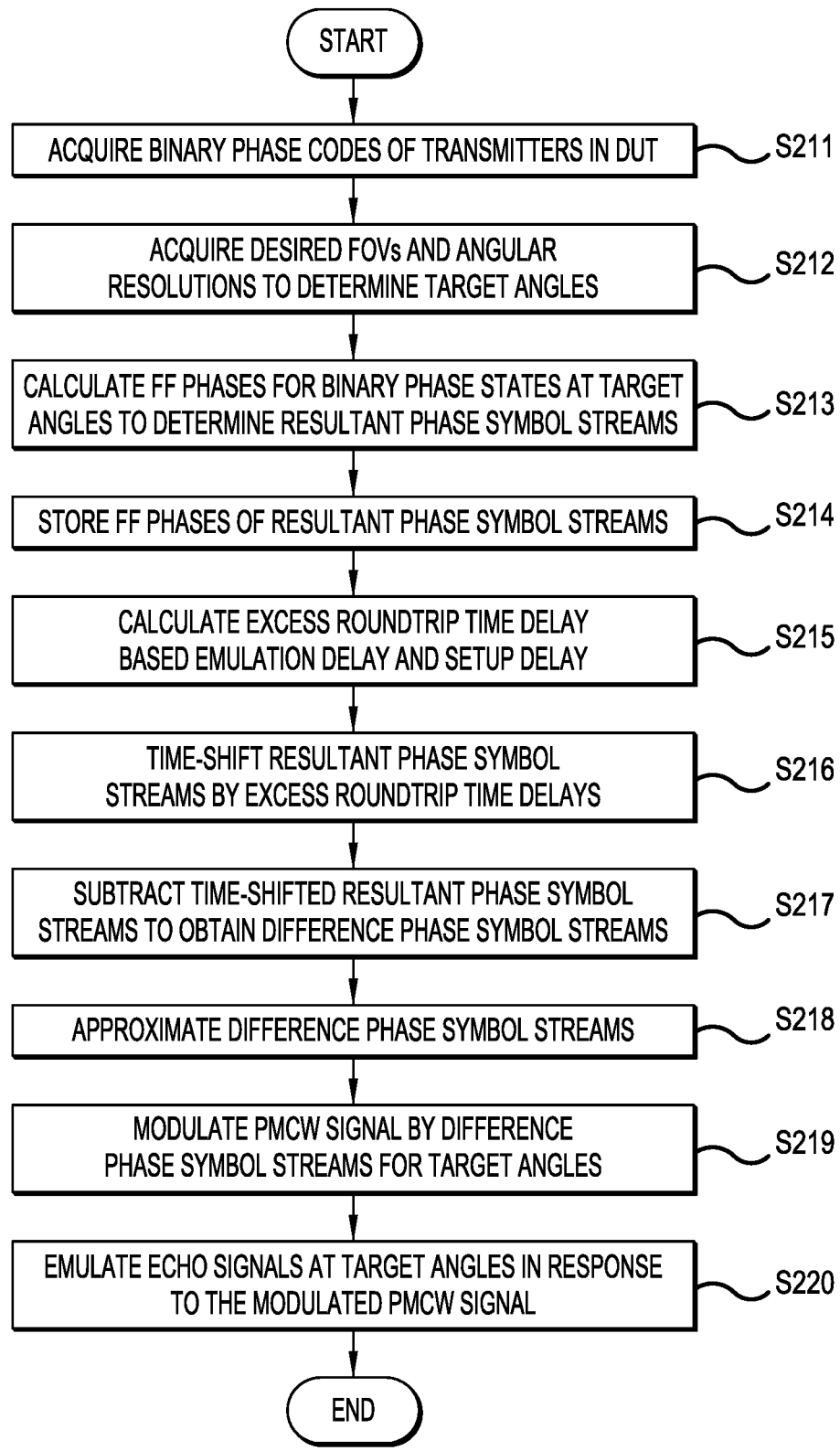
FIG. 2A is a simplified flowchart illustrating a general method for emulating a target distance for a PMCW radar signal, according to a representative embodiment.

FIG. 2A is a simplified flowchart illustrating a general method for emulating a target distance for a PMCW radar signal, according to a representative embodiment. The method may be implemented on the system 100, discussed above, for example. In an embodiment, the operations indicated by blocks S211 through S217 of FIG. 2A are precomputations, meaning that they are performed prior to live testing (e.g., actual operation) of the radar DUT 102. In comparison, the operation indicated by block S218 occurs during the live testing of the radar DUT 102, which includes active (live) modulation of the MRDs 110. The results of the operations indicated by blocks S211 through S217 may be stored in the database 120, for example, to be accessed during the live testing.

Referring to FIG. 2A, an orthogonal binary phase code (phase code), also known as binary phase symbols, of the PMCW radar signal for each of the multiple radar transmitters of the DUT 102 is acquired in block S211. The PMCW radar signal is a carrier signal binary phase modulated across a chirp bandwidth according to the phase code. Because of the phase coding, each PMCW radar signal (and each corresponding radar transmitter of the DUT 102) has a unique signature. The DUT 102 is able to separate out the various target echo signal streams corresponding to the multiple radar transmitters using the phase codes. Thus, acquiring the phase codes enables performance of the precomputations. As the testing is likely to occur in cooperation with the DUT manufacturer, the phase codes may be acquired from the DUT manufacturer prior to the testing. For example, the phase codes for the radar transmitters may be provided along with the DUT 102 in a transportable computer readable medium in the DUT itself or provided separately using a portable memory device, such as a compact disk, a DVD, a USB drive, or any other form of storage medium known in the art, or downloaded from a database server over a network. Alternatively, the phase codes may be determined empirically, for example, by consecutively turning off all of the radar transmitters of the DUT 102 except for one, and observing PMCW radar signal of the one operating radar transmitter. Regardless of how they are acquired, the phase codes may be stored in the database 120, for example, for later use.

In block S212, the desired field of view (FOV) and angular resolution are acquired for each of the multiple radar transmitters of the radar DUT 102. Again, this information may be acquired from the DUT manufacturer or may be determined empirically, and stored, e.g., in database 120. The target angles or angles of arrival to be tested are determined based on the desired FOV using a step size corresponding to the desired angular resolution. A list of potential target angles may be prepared using the FOVs and angular resolutions for the radar transmitters in order to perform pretest computations.

Since PMCW is binary phase, at each transmit symbol period of each of the transmit radar signals, there are $2^{\#Tx}$ possible binary phase combinations (code states), where #Tx is the total number of transmit antennas in the radar DUT 102 corresponding to the radar transmitters. So, for example, when there are two transmit antennas (#Tx=2), there will be four possible code states. The code states indicate the number of degrees of freedom of the transmitted PMCW radar signals. Generally, in digital beamforming, "phasing" of antennas to glean AoA information is done in baseband processing rather than at the DUT RF transmitter, and the $2^{\#Tx}$ code states are used for coding and multiplexing/demultiplexing purposes. To this end, a single phase code may be enough to prevent interference, but having separate phase codes for each of the (radar transmitters), as discussed above, allows the radar DUT 102 to distinguish between its own transmit streams when it does multiple-input and multiple-output (MIMO) processing.

In block S213, phases of PMCW signals are calculated for binary phase states of the transmit array at each of the target angles to determine time series, resultant phase symbol streams. That is, the phases (and optionally the magnitudes) of the transmit PMCW radar signals for each of the $2^{\#Tx}$ code states of the DUT transmit array are determined for the target angles determined in block S212, respectively. The phases are angle-dependent in the far field (far field phases). Notably, a first code state (180°, 180°, . . . , 180°) produces an identical far field wave to an opposing second code state (0°, 0°, . . . , 0°), but with a global 180° phase shift, which is independent of target azimuth and elevation angles. In fact, for each state there is another state that is just a global 180° shift. Accordingly, in an embodiment, only $2^{\#Tx-1}$ unique calculations may be performed per angle, and the other $2^{\#Tx-1}$ far field phase distributions may be determined by simply performing global −180° phase shifts of the calculated far field phase distributions. This is half the number of possible code states, which is generally larger than half the number of transmitters.

In block S214, at least the phases determined block S213 are stored in memory as the resultant phase symbol streams. The resultant magnitudes also may be stored, although this is optional as subsequent determinations do not rely on magnitude. The resultant phases (and magnitudes) may be stored in the database 120, for example.

Excess roundtrip time delay ($t_{excess}$) of each of the phase symbol streams is calculated in block S215. This identifies the difference in roundtrip time delay between where the resultant symbol streams are in setup time delay and where the resultant phase symbol streams should be in the emulated time delay. Determining the excess roundtrip time delay with regard to an emulated target relies on the physical setup delay ($d_{su}$) based on an actual distance between the radar DUT 102 and the MRD 110 corresponding to the emulated target, and the desired emulation delay ($d_{em}$) based on a desired or emulated distance between the radar DUT 102 and the emulated target, as discussed above. Given this information, the excess roundtrip time delay ($t_{excess}$) is calculated in symbol periods for each of the resultant phase symbol streams in accordance with Equation (3), where c is the speed of light:

$$t_{excess}=2(d_{em}-d_{su})/c \qquad \text{Equation(3)}$$

In block S216, each of the resultant phase symbol streams is time-shifted by the corresponding excess roundtrip time delay $t_{excess}$ determined in block S215, and the time-shifted resultant phase symbol stream is subtracted from the unshifted resultant phase symbol stream determined in block S213 to provide a difference phase symbol stream, modulo 360 degrees. The difference phase symbol stream effectively provides a corrected version of the unshifted resultant phase symbol stream, which appears to be reflected from the emulated target and the desired distance.

The difference phase symbol stream is approximated by a positive number of bits in block S217, since there is no cost-effective infinite phase precision, using phase quantization, for example. That is, the unshifted resultant phase symbol stream does not need to be corrected to an infinite number of bits, as a practical matter. Therefore a representative number of bits may be chosen, such as 1, 2 or 3 bits, for example, in order to approximate the difference phase symbol stream.

As mentioned above, in an embodiment, the operations indicated by blocks S211 through S217 are precomputations, and the operation indicated by block S218 is performed during the live testing of the radar DUT 102. In particular, in block S218, the I-Q mixer 403 of the MRD 110 is driven by the approximated difference phase symbol stream determined in block S217 to provide an I-Q modulation phase. The I-Q modulation phase adds to the received resultant phase at the re-illumination antenna 108, and thereby approximately reconstructs the resultant stream at the later emulated delay time. So, the known PMWC radar signal (resultant phase symbol stream) at the setup point of the MRD 110 is changed to indicate the PMWC radar signal at the emulated target point.

Figure 2B:
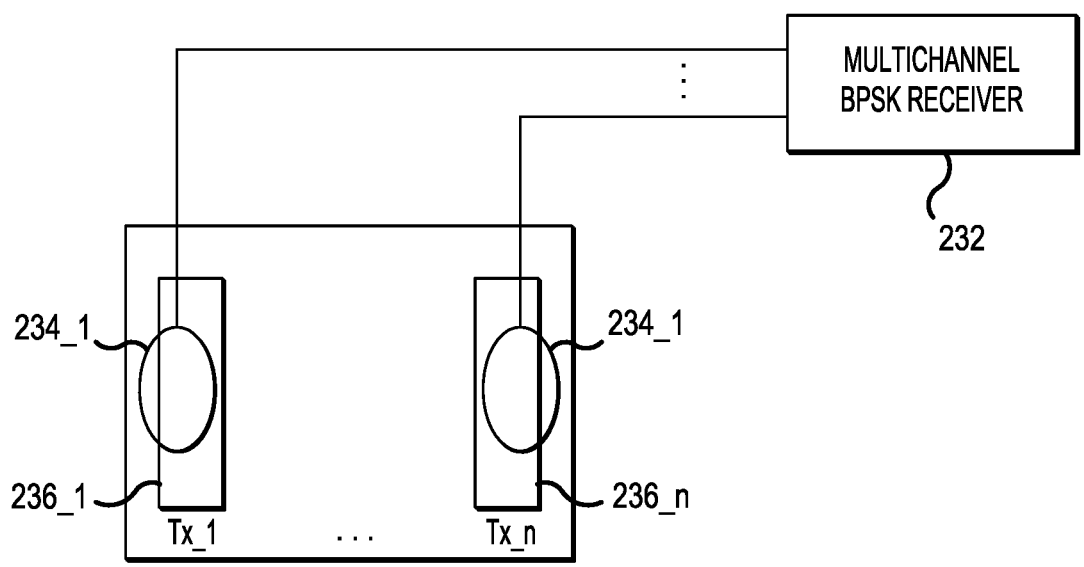
FIG. 2B is a simplified block diagram showing an apparatus to gather orthogonal binary phase code (phase code) of the PMCW radar signal for each of the multiple radar transmitters of a device under test (DUT).

FIG. 2B is a simplified block diagram showing an apparatus 230 to gather orthogonal binary phase code (phase code) of the PMCW radar signal for each of the multiple radar transmitters of a device under test (DUT). Various aspects of the apparatus 230 are common to those of various representative embodiments described herein, and the details of these aspects may not be repeated.

As noted above, the phase codes at block S211 may be acquired directly from the DUT manufacturer. However, in the event that the phase codes are not provided, the apparatus 230 may be provided. Specifically, a multichannel BPSK receiver having a plurality of inputs is connected to a plurality of near field probes 234_ . . . 234_n. Specifically, in accordance with a representative embodiment, the DUT (not shown in FIG. 2B) has a plurality of transmit antenna 236_1 . . . 236_n, where n is an integer. A corresponding near field probe 234_x is disposed in front of a respective one of the transmit antenna 236_x, and between the antenna 236_x and a respective re-illumination antenna 108 (see, e.g., FIG. 1A). Each of the plurality of near field probes 234_ . . . 234_n provides a sample of the output of a respective one of the plurality of transmit antenna 236_1 . . . 236_n to BPSK receiver 232 for gathering the phase codes for each of the plurality of transmit antenna 236_1 . . . 236_n. Once the phase codes are determined, the method 200 continues at block 212 as described above.

Notably, if the phase codes are not excessively long, (e.g., repeats every frame) then a single probe can be scanned across the n transmit subarrays, perhaps blocking the n−1 unsampled subarrays at any spatial sampling position for improved discrimination. However, when the code repetition length extends over many frames, it becomes necessary to use the parallel probing arrangement as shown to ensure we have proper time alignment of the individual Tx codes.

Figure 3:
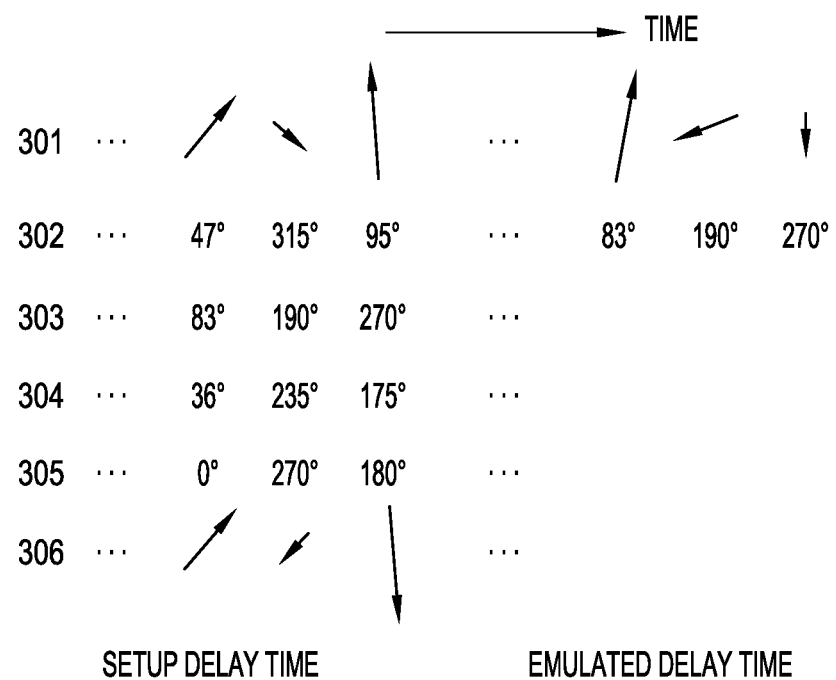
FIG. 3 shows determination of a reflected emulated radar signal from an emulated target after correcting for phase difference, according to a representative embodiment.

FIG. 3 shows determination of a reflected emulated radar signal from an emulated target after correcting for phase difference, according to a representative embodiment.

Referring to FIG. 3, first line 301 shows resultant vectors, representing voltage phasors, that indicate phase and magnitude of a round trip delay over time for actual and emulated delay of a resultant phase symbol stream of a PMWC signal at one far field angle. The first set of three vectors reflects setup delay times of the resultant phase symbol stream as measured at the MRD 110, and the second set of three vectors reflect desired emulated delay times of the resultant phase symbol stream determined at the MRD 110. The setup delay time is the round trip delay inherent in the physical distance between radar DUT 102 and the MRD 110. The emulated delay time is the round trip delay that would result from the emulated distance between the radar DUT 102 and the location of the emulated target. The vectors in the first line 301 indicate far field angle dependent resultant phase symbol streams. The resultant vectors are different lengths (magnitudes), which may be caused by some code states resulting in constructive interference in a given angular direction and other code states resulting in destructive interference in the same direction.

Second line 302 shows numerical phase representations of the resultant phase symbol stream corresponding to the vectors shown in the first line 301. The phases at the setup delay times shown in the second line 302 are 47 degrees, 315 degrees and 95 degrees, while the corresponding phases at the desired emulated delay times shown in the third line 303 are 83 degrees, 190 degrees and 270 degrees. Notably, the phases are the same as the directions for the vectors, but are aligned to the emulated time delays rather than the setup time delays.

Third line 303 shows the time-shifted phases from the excess roundtrip time delay, as discussed above with reference to blocks S215 and S216 in FIG. 2A. Fourth line 304 shows the difference phase symbol stream modulo 360 degrees that is determined by subtracting the resultant phase symbol stream from the time-shifted resultant phase symbol stream to obtain a difference phase symbol stream. The phase differences in the fourth line 304 are 36 degrees, 235 degrees and 175 degrees modulo 360, respectively. With regard to the 235 degrees phase difference, the actual difference is −125 degrees, which becomes 235 degrees per the modulo 360 operation.

Fifth line 305 shows the approximation of the difference phase symbol stream to be used in the I-Q mixer for the difference phase symbol stream for delay emulation, as discussed above with reference to block S217 in FIG. 2A. In the depicted example, the approximation is made using two bits, although other numbers of bits may be incorporated without departing from the scope of the present teachings. Using two the two-bit approximation, each of the phase differences is approximated by the closest multiple of 90 degrees, such that the 36 degrees phase difference is approximated by zero degrees, the 235 degrees phase difference is approximated by 270 degrees, and the 175 degrees phase difference is approximated by 180 degrees. Similarly, if a three-bit approximation were used, for example, each of the phase differences would be approximated by the closest multiple of 45 degrees.

Sixth line 306 shows vectors, representing voltage phasors, that indicate phase and magnitude of the approximated difference phase symbol stream over time, corrected for the phase differences. Notably, the stream of arrows indicating the approximated difference phase symbol stream in the sixth line 306 point in substantially the same directions as the stream of arrows indicating the resultant phase symbol stream in the first line 301. Thus, the two phase symbol streams are well correlated in phase, although the magnitudes do not necessarily match since there has been no attempt at magnitude correction. In the depicted example, the returned magnitude may be too small, like the second arrow in the sixth line 306, or too large, like the third arrow in the sixth line 306. However, since PMCW uses correlation over an entire pulse's worth of symbols (where a pulse is the duration of a radar period, equivalent to one chirp or one frame in FMCW), the magnitude mismatches are secondary to the phase mismatches, which have been prioritized. For example, substituting 0.5 for 1.0 at one symbol time and 2.0 for 1.0 at a later symbol time (representing changing magnitude) are only marginally consequential as compared to substituting −1.0 for 1.0 at the one symbol time and 1.0 for 1.0 at the later symbol time (representing changing phase). In an embodiment, the magnitudes of the vectors may be renormalized so that the expected correlation strength matches that of an actual target, as will be discussed presently.

Figure 4:
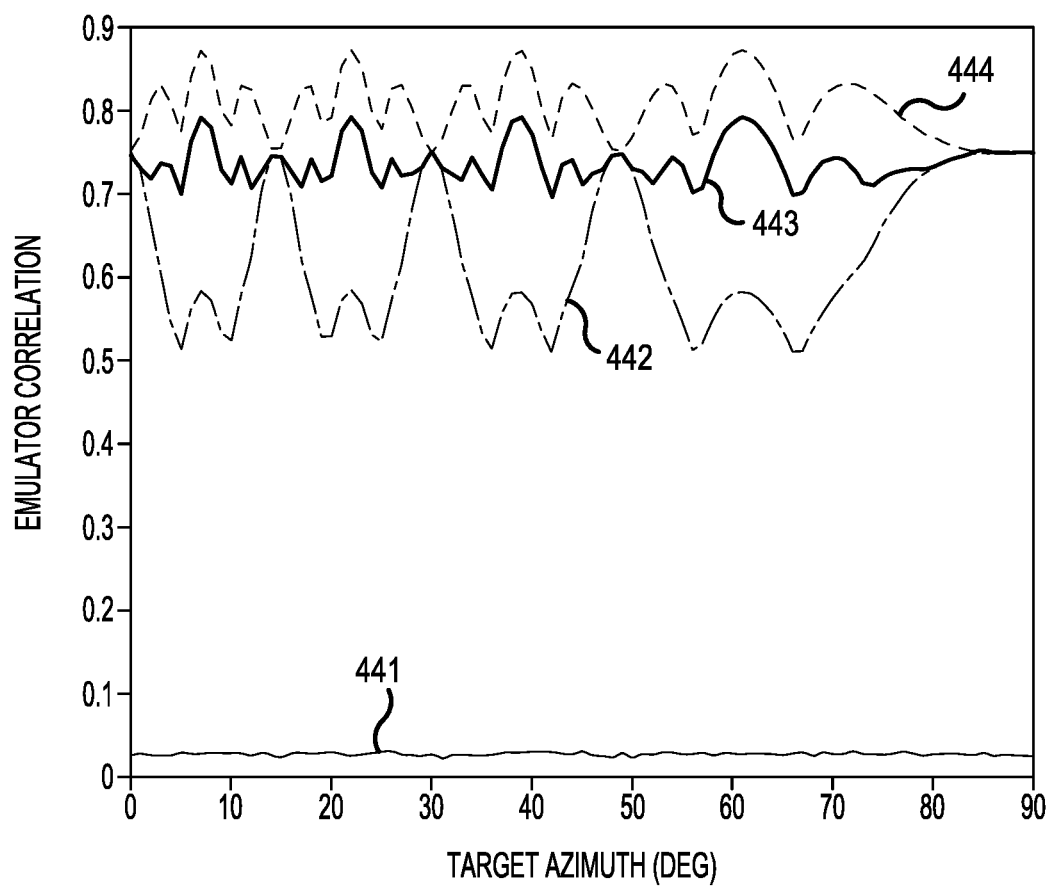
FIG. 4 is a graph showing emulator correlation results with respect to delay as a function of azimuth angle to the emulated target, according to a representative embodiment.

FIG. 4 is a graph showing emulator correlation results with respect to delay as a function of azimuth angle to the emulated target, according to a representative embodiment. In the depicted example, the code length of the PMCW pulse is 1000. Also, the correlation results are for a typical automotive radar DUT configuration having four receive antennas spaced by $\lambda/2$ and three transmit antennas spaced by the number of receive antennas times $\lambda/2$, which in the example is $2\lambda$. This is a so-called "virtual array" design common in digital beamforming radar.

Referring to FIG. 4, trace 441 indicates 0 bits of phase modulation (i.e., no correlation), trace 442 indicates 1 bit of phase modulation, trace 443 indicates 2 bits of phase modulation, and trace 444 indicates infinite bits of phase modulation, for purpose of illustration. With zero bits of phase modulation, the correlation with the emulated target distance is reduced from unity to $\sim 1/\sqrt{\text{codelength}}$, which is a well-known principle of PMCW (as well as CDMA), as shown by trace 441. If phase modulation were performed by the exact difference phase (infinite bit phase modulation), as shown by trace 444, maximum correlation is achieved from about 75 percent to almost 90 percent correlation. The reason the correlation is not 100 percent is because no magnitude correction is being performed, as discussed above, which reduces complexity, cost and power, among other advantages.

Phase modulation performed at one bit, as shown by trace 442, provides correlation of about 50 percent to about 75 percent. The one bit phase modulation phase modulation may be bi-phase modulation (BPM) or binary phase shift keying (BPSK) modulation, for example. Phase modulation performed at two bits, as shown by trace 443, provides correlation of about 70 percent to about 80 percent. The two bit phase modulation phase modulation may be quadratic phase modulation (QPM) or quadrature phase shift keying (QPSK) modulation, for example. Generally, two bit phase modulation is a good compromise, since it enables use the I-Q mixer 403 of the MRD 110 with minimal drive complexity and obtains almost the same emulation fidelity as that obtained by infinite bit phase modulation shown by trace 444.

In an embodiment, the gain of the VGA 404 may be increased slightly using the gain control 445 to bring the average correlation back to unity. Some target angles will see slightly more correlation and some slightly less correlation, although radar cross section (RCS) tends to vary over much greater ranges anyway. When an even flatter correlation versus target angle is desired, the gain of the VGA 404 may be adjusted based on the target AoA. The adjustment is made using the appropriate graph in FIG. 4, with the adjustment of the VGA gain to compensate. For example, if there is a dip of 1 dB at 36 degrees, the gain is increased by 1 dB for that angle. Additionally, potential ghost target distances are still suppressed by $\sim 1/\sqrt{\text{codelength}}$ the phase modulation, as discussed in U.S. Provisional Patent Application No. 62/889,267. This includes the setup distance. As far as the radar is concerned, setup as a reflection point has been effectively replaced by a virtual reflector at the emulation point.

The above disclosure is directed to determining round trip delay based on emulated distance to a single emulated target per MRD 110. However, one MRD 110 may be used to emulate multiple targets at the same target angle. That is, in an embodiment, emulated distances are determined from the radar DUT 102 to each of multiple emulated targets sharing the same target angle (AoA), but at different emulated distances.

Figure 5:
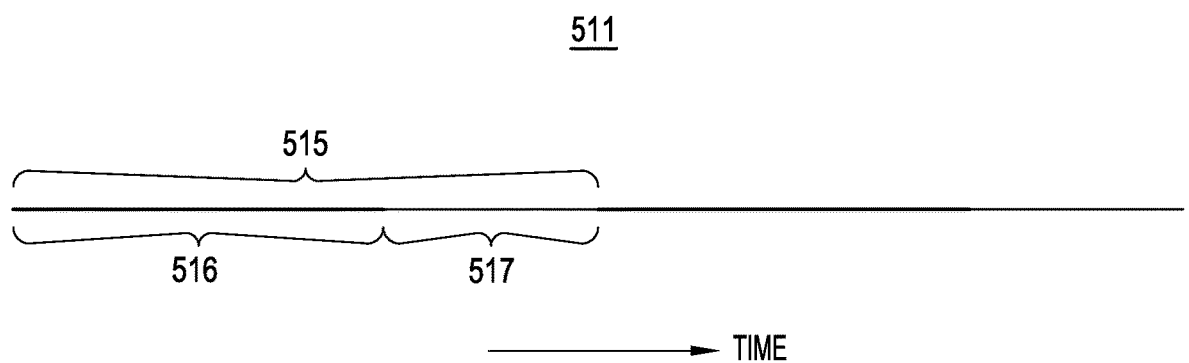
FIG. 5 is a graph showing a phase symbol stream of a PMCW signal with pulses subdivided into two sub-streams corresponding to emulated targets at different distances, according to a representative embodiment.

FIG. 5 is a graph showing a phase symbol stream of a PMCW signal provided at a given target angle with pulses subdivided into two sub-streams corresponding to two emulated targets at different distances from the radar DUT, according to a representative embodiment. That is, PMCW signal includes a phase symbol stream 511 having an illustrative pulse 515 that is subdivided into a first sub-stream 516 modulated to emulate distance to a first emulated target at the target angle, and a second sub-stream 517 modulated to emulate distance to a second emulated target at the same target angle, where distance to the second emulated target is greater than distance to the first emulated target.

PMWC radars (and FMCW radars) essentially use correlation to acquire the measurement data of interest. For example, the correlation may be performed using a multi-dimensional fast Fourier transforms (FFT) technique, although other techniques may be incorporated herein without departing from the scope of the present teachings. For a single target emulation distance at a given target angle, correlation is code-suppressed at all distances other than the emulated distance. In order to emulate multiple targets at two different distances, for example, but the same target angle, unsuppressed correlation at both of the distances is allowed. For PMCW radars, in particular, this is achieved by partitioning each pulse 515 of the phase symbol stream 511 into interleaved first and second sub-streams 516 and 517, and phase-correcting the first sub-stream 516 for the first emulated target and phase-correcting the second sub-stream 517 for the second emulated target.

As shown in FIG. 5, the duty cycles of the first and second sub-streams 516 and 517 need not equal, so unequal fractions of the pulse 515 may be exploited to emulate different return signal strengths (e.g., RCSs) of echo signals to the radar DUT. Again, VGA gain may be increased to account for only partial correlation for one or both first and second emulated targets. The process may be generalized to more than two emulated targets at different distances, without departing from the scope of the present teachings.

Figure 6A:
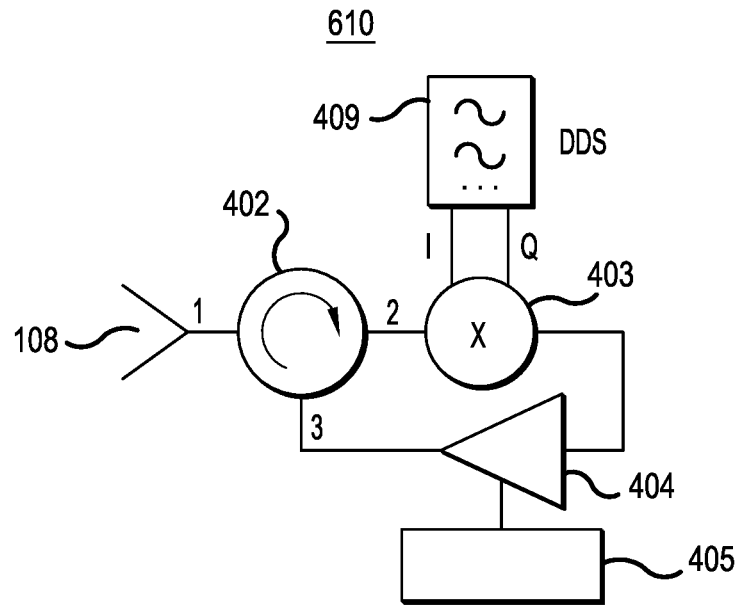
FIG. 6A is a simplified block diagram showing an MRD including digital direct synthesis (DDS), in accordance with a representative embodiment.
Figure 6B:
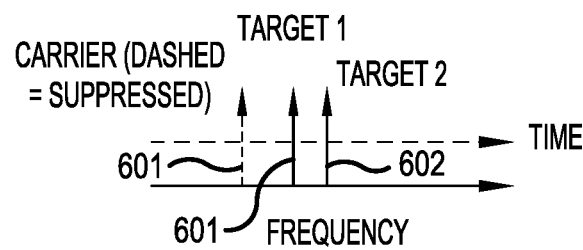
FIG. 6B is a is a chart showing an illustrative tone snapshot of a radar signal subject to DDS processing, in accordance with a representative embodiment.

FIG. 6A is a simplified block diagram showing an MRD including digital direct synthesis (DDS), in accordance with a representative embodiment. FIG. 6B is a chart showing an illustrative tone snapshot of an FMCW signal subject to DDS processing, in accordance with a representative embodiment.

Referring to FIG. 6A, MRD 610 is substantially the same as the MRD 110 shown in FIG. 1B, with the addition of DDS 409 for implementation of multitone modulation. In the depicted embodiment, the DDS 409 provides multiple frequency offset sidebands from the chirping carrier, which are used to emulate multiple target distances for targets at the same target angle. So, for example, when the chirp rate is $k_{sw}$, then the desired offset frequency $\delta f^*$ is $2k_{sw}(d_{em}-d_{su})/c$, per Equation (1) above. Hence, for multiple targets at $d_{em1}$, $d_{em2}$, . . . , $d_{emi}$, single sideband (SSB) modulation is performed at $\delta f_1^*=2k_{sw}(d_{em1}-d_{su})/c$, $\delta f_2^*=2k_{sw}(d_{em2}-d_{su})/c$, etc.

Referring to FIG. 6B, vertically oriented arrows indicate discrete frequencies or tones. Tone 601 is the carrier of the FMCW radar signal, which is suppressed (indicated by dashed arrow). Tone 602 corresponds to a first sideband of the carrier for emulating first emulated targets, and tone 603 corresponds to a second sideband of the carrier for emulating second emulated targets. The time arrow signifies that the frequency tones 602 and 603 rigidly increase with time due to upchirp of the carrier. Use of the first and second sidebands reduces efficiency of correlation of the FMWC radar with an increase of the number of emulated targets. Notably, since the offset frequencies are only a few MHz maximum, the DDS 409 may be relatively inexpensive.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of emulating echo signals reflected from emulated radar targets in response to radar signals transmitted by a transmit array, including a plurality of transmitters, in a radar device under test (DUT), the method comprising:
acquiring desired fields of view (FOVs) and desired angular resolutions of the plurality of transmitters in the radar DUT to determine target angles of the emulated radar targets;
calculating far field phases of a radar signal for binary phase states of the transmit array at each of the target angles to determine resultant phase symbol streams;
calculating an excess roundtrip time delay for each emulation delay between the radar DUT and each of the emulated radar targets, and each setup delay between the radar DUT and a physical distance between the radar DUT and each emulator receiver;
time-shifting the resultant phase symbol streams by the excess roundtrip time delays;

subtracting the time-shifted resultant phase symbol streams from the resultant phase symbol streams to obtain difference phase symbol streams;

modulating a radar signal transmitted by the radar DUT by the difference phase symbol streams for each of the target angles; and emulating the echo signals at the target angles in response to the modulated radar signal.

2. The method of claim 1, further comprising:
approximating the difference phase symbol streams, wherein modulating the radar signal transmitted by the radar DUT comprises modulating using approximated difference phase symbol streams.

3. The method of claim 2, wherein the difference phase symbol stream is approximated by two bits, such that each of the phase differences is approximated by the closest multiple of 90 degrees.

4. The method of claim 2, wherein the difference phase symbol stream is approximated by three bits, such that each of the phase differences is approximated by the closest multiple of 45 degrees.

5. The method of claim 1, wherein the radar signals are phase-modulated continuous-wave (PMCW) radar signals.

6. The method of claim 5, further comprising:
acquiring binary phase codes of the plurality of transmitters in the radar DUT, the binary phase codes enabling of the plurality of transmitters to distinguish corresponding radar signals transmitted by the transmit array.

7. The method of claim 1, further comprising:
storing the far field phases of the resultant phase symbol streams before calculating the excess roundtrip time delay for each emulation delay and each setup delay.

8. The method of claim 1, wherein the number of binary phase states of the transmit array is equal to two raised to a power of the number of transmitters in the transmit array.

9. The method of claim 1, wherein each emulator receiver comprises a modulated reflection device (MRD).

10. The method of claim 1, wherein the excess roundtrip time delay ($t_{excess}$) is calculated according to:

$$t_{excess}=2(d_{em}-d_{su})/c,$$

wherein $d_{em}$ is the emulation delay, $d_{su}$ is the setup delay, and c is the speed of light.

11. The method of claim 1, wherein the number of transmitters is 2, and the number of binary phase states of the transmit array is 4.

12. A system for testing vehicular radar of a radar device under test (DUT) comprising a transmit array, including a plurality of transmitters, the system comprising:
a re-illumination element configured to receive radar signals transmitted by the plurality of transmitters, and to transmit emulated echo signals back to the radar DUT;
a controller configured to control the re-illumination element and to perform performance testing on the vehicular radar, the controller comprising a processor and a memory storing instructions that, when executed by the processor, cause the processor to perform a method comprising:
acquiring binary phase codes of the plurality of transmitters in the radar DUT;
acquiring desired fields of view (FOVs) and desired angular resolutions of the plurality of transmitters in the radar DUT to determine target angles of the emulated radar targets;
calculating far field phases of a radar signal for binary phase states of the transmit array at each of the target angles to determine resultant phase symbol streams;
calculating an excess roundtrip time delay for each emulation delay between the radar DUT and each of the emulated radar targets, and each setup delay between the radar DUT and a physical distance between the radar DUT and each emulator receiver;
time-shifting the resultant phase symbol streams by the excess roundtrip time delays;
subtracting the time-shifted resultant phase symbol streams from the resultant phase symbol streams to obtain difference phase symbol streams;
causing a radar signal transmitted by the radar DUT to be modulated by the difference phase symbol streams for each of the target angles; and
emulating the echo signals at the target angles in response to the modulated radar signal.

13. The system of claim 12, the method performed by the processor further comprises:
approximating the difference phase symbol streams, wherein modulating the radar signal transmitted by the radar DUT comprises modulating using approximated difference phase symbol streams.

14. The system of claim 12, further comprising:
a database that stores the far field phases of the resultant phase symbol streams, to be used by the processor for calculating the excess roundtrip time delay for each emulation delay and each setup delay.

15. The system of claim 12, wherein the radar signals are phase-modulated continuous-wave (PMCW) radar signals.

16. The system of claim 12, wherein the re-illumination element comprises at least one modulated reflection device (MRD), the at least one MRD comprising: an antenna; a circulator; an in-phase-quadrature (IQ) mixer; and a variable gain amplifier (VGA).

17. The system of claim 12, wherein the binary phase codes of the plurality of transmitters are acquired from a manufacture of the radar DUT.

18. A non-transitory computer readable medium having stored thereon software instructions that, when executed by a processor, cause the processor to perform a method for testing vehicular radar of a radar device under test (DUT) comprising:
acquiring binary phase codes of the plurality of transmitters in the radar DUT;
acquiring desired fields of view (FOVs) and desired angular resolutions of the plurality of transmitters in the radar DUT to determine target angles of the emulated radar targets;
calculating far field phases of a radar signal for binary phase states of the transmit array at each of the target angles to determine resultant phase symbol streams;
calculating an excess roundtrip time delay for each emulation delay between the radar DUT and each of the emulated radar targets, and each setup delay between the radar DUT and a physical distance between the radar DUT and each emulator receiver;
time-shifting the resultant phase symbol streams by the excess roundtrip time delays;
subtracting the time-shifted resultant phase symbol streams from the resultant phase symbol streams to obtain difference phase symbol streams;
causing a radar signal transmitted by the radar DUT to be modulated by the difference phase symbol streams for each of the target angles; and emulating the echo signals at the target angles in response to the modulated radar signal.

19. The non-transitory computer readable medium of claim 18, wherein the software instructions, when executed by the processor, further cause the processor to approximate the difference phase symbol streams, wherein the radar signal transmitted by the radar DUT is modulated using approximated difference phase symbol streams.

20. The non-transitory computer readable medium of claim 19, wherein the excess roundtrip time delay ($t_{excess}$) is calculated according to:

$$t_{excess}=2(d_{em}-d_{su})/c,$$

wherein $d_{em}$ is the emulation delay, $d_{su}$ is the setup delay, and c is the speed of light.

* * * * *